United States Patent
Thomas et al.

(10) Patent No.: US 8,502,645 B2
(45) Date of Patent: Aug. 6, 2013

(54) RFID MONITORING SYSTEM

(75) Inventors: Robert Victor Thomas, Wimborne (GB); Peter Rudland, Wimborne (GB)

(73) Assignee: Avonwood Developments Ltd, Dorset (GB)

( * ) Notice: Subject to any disclaimer, the term of this patent is extended or adjusted under 35 U.S.C. 154(b) by 518 days.

(21) Appl. No.: 12/666,913

(22) PCT Filed: Jun. 26, 2008

(86) PCT No.: PCT/GB2008/050498
§ 371 (c)(1),
(2), (4) Date: May 13, 2010

(87) PCT Pub. No.: WO2009/004366
PCT Pub. Date: Jan. 8, 2009

(65) Prior Publication Data
US 2010/0328037 A1    Dec. 30, 2010

(30) Foreign Application Priority Data

Jun. 29, 2007 (GB) .................................. 0712621.2

(51) Int. Cl.
*H04Q 5/22* (2006.01)
*G01S 3/56* (2006.01)
*G01S 3/02* (2006.01)

(52) U.S. Cl.
USPC ..... 340/10.1; 340/10.2; 340/10.5; 340/572.1; 340/572.4; 342/425; 342/451

(58) Field of Classification Search
USPC .................... 340/10.1, 10.2, 10.3, 10.4, 10.5, 340/572.4, 572.15, 572.1
See application file for complete search history.

(56) References Cited

U.S. PATENT DOCUMENTS

| 6,154,635 | A  | * | 11/2000 | Ohta ............................ 455/41.1 |
| 6,703,935 | B1 |   | 3/2004  | Chung et al. |
| 6,982,640 | B2 |   | 1/2006  | Lindsay et al. |
| 7,091,864 | B2 | * | 8/2006  | Veitch et al. ............... 340/572.8 |
| 7,350,703 | B2 | * | 4/2008  | Ambartsoumian ........... 235/385 |
| 7,737,858 | B2 | * | 6/2010  | Matityaho .................. 340/572.8 |
| 7,775,056 | B2 | * | 8/2010  | Lowenstein .................... 62/127 |

(Continued)

FOREIGN PATENT DOCUMENTS

| DE | 10060156 A1 | 6/2002 |
| EP | 1703435 A2  | 9/2006 |

(Continued)

*Primary Examiner* — Daniel Wu
*Assistant Examiner* — Mancil Littlejohn, Jr.
(74) *Attorney, Agent, or Firm* — Endurance Law Group, PLC

(57) ABSTRACT

A radio frequency identification (RFID) monitoring system (12) for monitoring a plurality of RFID tags, and in particular for monitoring a plurality of vials incorporating such tags and stored at a low temperature, (eg.−80° C.) within a storage unit (10), for example a freezer. The RFID system (12) comprises an RFID reader (28) and at least one antenna (34*a*-34*i*) for transmitting and receiving RF signals to communicate with the RFID tags. The system (12) further includes an electronic switch (38), preferably a FET switch, interposed between the RFID reader and the at least one antenna (34*a*-34*i*) to connect a particular antenna (34*a*-34*i*) to the RFID reader (28) and transmit RF signals from the antenna (34*a*-34*i*) to the RFID tags. The switch (38) is controlled to intermittently connect the antenna (34*a*-34*i*) to the RFID reader (28) to regulate the power of the RF signal transmitted from the antenna (34*a*-34*i*). The system enables an RFID tag to operate at low temperatures. Preferably the switch (38) and antenna (34*a*-34*i*) are integrated together, and in particular integrated into a shelf (22) of the storage unit (10).

22 Claims, 2 Drawing Sheets

(56) References Cited

U.S. PATENT DOCUMENTS

| | | | |
|---|---|---|---|
| 7,791,479 B2 * | 9/2010 | Dearing et al. | 340/572.1 |
| 7,808,366 B2 * | 10/2010 | Son et al. | 340/10.1 |
| 7,881,988 B2 * | 2/2011 | Otani et al. | 705/28 |
| 2003/0174099 A1 | 9/2003 | Bauer et al. | |
| 2005/0247782 A1 | 11/2005 | Ambartsoumian | |
| 2009/0322486 A1 * | 12/2009 | Gerstel | 340/10.1 |

FOREIGN PATENT DOCUMENTS

| | | |
|---|---|---|
| EP | 1793326 A2 | 6/2007 |
| EP | 1814059 A2 | 8/2007 |
| GB | 2433385 A | 6/2007 |
| WO | 01/03237 A1 | 1/2001 |
| WO | 2007/024540 A1 | 3/2007 |
| WO | 2008114269 A | 9/2008 |

* cited by examiner

RFID MONITORING SYSTEM

BACKGROUND OF THE INVENTION

1. Field of the Invention

The present invention relates to inventory control systems, and in particular, to RFID tracking and monitoring of stored items. More specifically it relates to tracking and storage of items, for example vials containing biological material, stored within a low temperature environment in for example a freezer using RFID tags.

2. Related Art

Inventory management and control systems are used to track and monitor an inventory of stored items. In such systems each stored article may be assigned a unique identification number. A database is then used to track the location of the item using the unique identification number to identify each article. In more sophisticated systems the unique identification number may be encoded onto a radio frequency identification (RFID) tag which is attached to the article. The RFID tag when excited and interrogated by a radio frequency interrogation signal of the correct frequency will then resonate and be inductively coupled to transmitted a radio frequency signal including the unique identification number encoded on the RFID tag. This can then be received by a radio frequency receiver and reader connected to the database to automatically identify and record the presence of the RFID tag and article with that unique ID without manually entering the ID number. Such systems are well known and provide a convenient automatic way to identify and then track and monitor various stored items.

Examples of various prior inventory management and control systems for monitoring stored items, including items stored in freezers and fridges, using RFID tags on the times and RFID tag reader arrangements are described in: EP 1793326; US 2005/0247782; U.S. Pat. No. 6,982,640; US 2003/0174099; and WO 2007/024540; EP1703435, EP 1814059 and GB 2433385 also describe particular RFID tag reader arrangements, which could be used in such inventory management systems. Typically in these systems a single RFID reader is connected to multiple antennas via various switching arrangements. The multiple antennas provide a larger range and area of coverage as well as target specific ranges. Specifically the switches allow connection to each respective antenna which operates over a localised region and area to thereby allow targeted reception and interrogation, as well as allowing wider coverage with less power than would be required from a single antenna designed to operate over the entire area. The switches operate to connect the different antenna and interrogate and power the RFID tags within the respective different antenna reception areas until they are all read. Each antenna area is connected and the tags interrogated, before then switching to the next antenna to read the tags covered by that antenna. The switches in these systems simply switch and connect to different antennas and particular areas.

Some articles may need to be stored and kept at very low temperatures, for example at approximately −80° C., and within freezer units. In particular it is often necessary to store biological samples and products a such low temperatures within suitable freezer units. It may furthermore be particularly important to accurately and securely track and monitor such stored biological items. However while RFID tag systems can be used, conventional RFID tags and inventory monitoring systems are generally only specified to operate down to −40° C., and are not considered in the art to be suitable to operate at such low temperatures (eg. −80° C.) at which such articles may be stored. Indeed operating such convention systems at such low temperatures has proved problematic and unreliable. Accordingly other, less reliable, and advantageous systems have to be used to track and monitor such stored items.

Another problem with RFID tag systems, in particular when used to monitor multiple items stored in a confined environment and in very close proximity to each other, is of interference between the signals from the tags such that the individual signals and identification numbers of the individual tags cannot be received and read. In addition the reader should ideally be matched to the inductive resonant load. However a large and varying number of tags, depending on number of items stored, will alter the inductive resonant load on the reader. Such problems are particularly problematic for items stored within a freezer where a large number of items may be stored within the confined environment of the freezer, and are furthermore shielded by the outer, generally metallic, casing of the freezer which further interferes with the RF signals.

It is therefore desirable to provide an improved system which addresses the above described problems and/or which offers improvements or an alternative to existing arrangements generally. In particular it is desirable to provide an improved RFID monitoring system which can operate at low temperatures. It is also desirable to provide an improved RFID monitoring system that can monitor a large number of items stored within a confined environment, and which is less susceptible to interference. Furthermore it is desirable to provide an improved integrated low temperature storage and monitoring system.

SUMMARY OF THE INVENTION

According to the present invention there is therefore provided a radio frequency identification (RFID) monitoring system, and a method of monitoring a plurality of RFID tags, as described in the accompanying claims. There is also provided a storage unit including such a radio frequency identification (RFID) monitoring system as further described in the accompanying claims. There is yet further provided a shelf for use in such a storage systems as yet further described in the accompanying claims.

In an embodiment of a first aspect of the invention there is provided a radio frequency identification (RFID) monitoring system for monitoring a plurality of RFID tags. The system comprises an RFID reader and at least one antenna for transmitting and receiving RF signals to communicate with the RFID tags. An electronic switch is interposed between the RFID reader and the at least one antenna and is controlled to intermittently connect the antenna to the RFID reader and transmit RF signals from the antenna to the RFID tags. The switch is preferably controlled to intermittently connect the antenna to the RF reader to regulate the power of the RF signal transmitted from the antenna.

Such an arrangement and intermittent operation of the switch regulates the power transmitted to the RFID tags and speed of the induced operation of the RFID tags thereby enabling the RFID tags to still effectively operate at low temperatures, for example −80° C.

Preferably the switch is controlled to intermittently connect the antenna to the RF reader by a control signal from the RF reader.

In an embodiment of a second aspect of the invention there is provided a radio frequency identification (RFID) monitoring system for monitoring a plurality of RFID tags. The system comprises an RFID reader and a plurality of antennas for transmitting and receiving RF signals to communicate with the RFID tags. An electronic switch is interposed between the RFID reader and each antenna of the plurality of antennas and is selectively operable to selectively connect each antenna to the RF reader.

This enables more localised and selective interaction with the RFID tags thereby reducing interference between the RFID tags and allowing easier matching of the loads provided by multiple REID tags.

Preferably the electronic switches are operable to connect only one antenna to the RF reader at a time.

Furthermore it is advantageous to incorporate and integrate the switches with the respective antenna, so that they are close to the actual antenna unit. This ensures that the antenna are isolated and even when disconnected do not resonate and form a resonant circuit that may undesirably resonate at the operating frequencies even when disconnected. Furthermore such integration of the switches with the antenna simplifies the assembly.

The electronic switch preferably comprises a field effect transistor. Such switches are particularly suitable since they reliably operate at low temperatures, and provide low resistance when closed. In addition their operating speed (opening and closing speed) has been found to be particularly suitable for the switching and operation with the RFID tags to slow the operation of the RFID tags, and they can be readily electronically controlled to provide the required switching and selective and intermittent connections.

In an embodiment of a third aspect of the invention there is provided a storage unit for storing a plurality of articles each contacting a radio frequency identification (RFID) tag, and including such an RFID monitoring system.

The storage unit may further comprise at least one metallic plate disposed adjacent to one of the at least one antennas to shield the one of the at least one antennas from a remaining region of the storage unit.

The storage unit is preferably a freezer unit.

In an embodiment of a fourth aspect of the invention there is provided a shelf for use in such a storage unit. The shelf comprises a shelf body upon which the articles may be located with the at least one antenna of the RFID monitoring system integrated into the shelf body.

The shelf may further comprise at least one metallic plate disposed adjacent to one of the at least one antennas to shield the one of the at least one antennas from a remaining region of the shelf.

The shelf may also further include a plurality of antennas integrated into respective discrete operative regions of the shelf.

BRIEF DESCRIPTION OF THE DRAWINGS

The present invention will now be described by way of example only with reference to the following figures in which.

DETAILED DESCRIPTION OF THE PREFERRED EMBODIMENT

Figure 1:
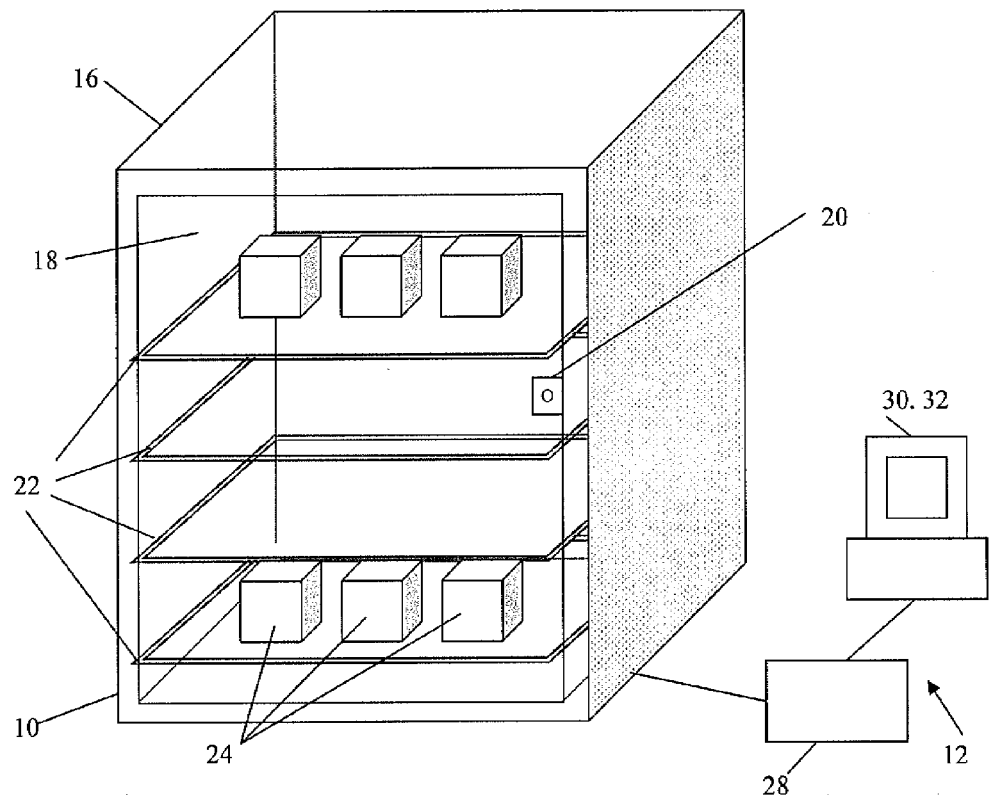
FIG. 1 is a schematic illustration of a freezer for storing multiple vials incorporating RFID tags, and an RFID tracking system of an embodiment of the present invention.

FIG. 1 illustrates a freezer 10 incorporating an RFID monitoring and tracking system 12 for monitoring a number of individual vials (not shown) stored in boxes within the freezer 10. The freezer 10 stores the vials at a low temperature, typically below −40° C., and typically down to −86° C. The freezer 10 comprises a cabinet 16 with a door 18 and a lock 20 to gain access to the inside of the freezer when unlocked. The freezer 10 includes, in this case four, shelves 22 upon which the boxes 24 containing vials of the biological material to be stored can be placed. The vials comprise small tubes, typically 12 mm in diameter, containing the biological material. The boxes 24 are shown schematically and illustratively in FIGS. 1 and 2, and each box 24 comprises a plastic box defining recesses 26 for holding in this case a hundred individual vials in a ten by ten grid pattern. The shelves 22 may each hold a number of such boxes 24, in this case up to nine boxes 24, in a three by three configuration. The shelves 22 preferably include their own corresponding detents and recess at the respective location and sized to receive the boxes 24 and hold them in position. It will be appreciated though that any number of shelves 22 and boxes 24 could be located and disposed within the freezer 10.

Each of the individual vials includes a small flat 9 mm RFID tag (not shown) attached to the vial and which is encoded with a unique identification number. The RFID tags are passive electronic units and comprise an antenna and a small application specific integrated circuit which operate as transceivers and inductively draw power when resonated by a resonating radio frequency from a compatible corresponding RF reader 28 to then in response transmit a radio frequency signal including a previously encoded and stored identification number and code. The RFID tags are generally conventional in themselves and will not be described in further detail.

The tracking system 12 comprises an RF reader 28 for communicating with the RFID tags on the vials and which is connected to a computer 30 and computer system 32 with a database for tracking the identified vials. The RF reader 28 transmits a radio frequency signal via an antenna 34a-34i to inductively power the RFID tags and receive the return RF signals from the tags. The computer system 30,32 may be connected to multiple RF readers 28 and to multiple freezers 10 to monitor the contents of a number of freezer units 10. The RF reader 28, and computer system 32 are generally conventional and their operation and implementation will also not be described in detail.

Figure 4:
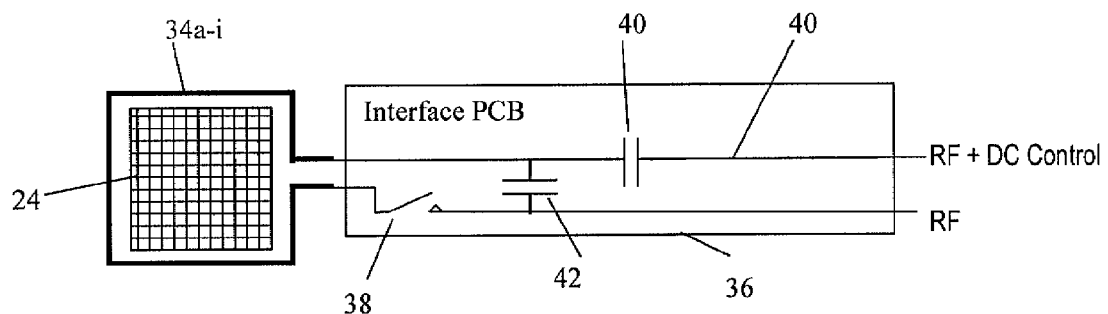
FIG. 4 is a more detailed schematic illustration of the interface unit and antenna shown in FIG. 3.

The tracking system 12 further comprises an interface unit 36 interposed between the RF reader 28 and a series of antenna 34a-34i located within the freezer 10. As shown in FIG. 4 the interface unit 3 comprises an electronically operated switch 38, preferably a Field Effect Transistor (FET) switch to selectively disconnect the antenna 34a-34i from the RF reader 28. The FET switch 38 is turned on to connect the RF reader 28 to the antenna 34a-34i by a control signal from the RF reader 28. In this case the FET switch 38 is operated via a 12V DC signal superimposed on the RF signal line 40 to and from the RF reader 28. The FET switch 38 is operated and controlled to only intermittently connect the antenna 34a-34i to the RF reader 28. This enables the power induced in the REID tags inductively coupled to the antenna 34a-34i to be regulated and the speed of operation of the RFID tags and their associated ASIC to be controlled and limited enabling them to operate at the low temperature, below −40° C. and down to for example −86° C., of the freezer 10.

In particular the operation of the ASIC of the RFID tags is temperature dependent. When the ASIC is heated its operation slows down and is sluggish. Conversely when the ASIC operates at a low temperature the transistors in the ASIC operate too fast, and eventually stop interacting with each other. The power induced in the RFID tag also rises and prevents the RFID tag working. As a result conventionally it has not been considered practical to operate and use RFID tags at such low temperatures. However it has been found that by only intermittently connecting the antenna 34a-34i to the RF reader 28 to only intermittently inductively couple the reader to RFID tags and power the tags the induced power is reduced. In addition by only intermittently connecting the antenna 34a-34i to the RF reader 28 the tags only intermittently operate. This slows the operation of the RFID tags and transistors. This avoids the ASI operating too fast. As a result the operation of the RFID tags at such low temperatures can be maintained. In particular since the RFID tags derive their power from the inductive coupling with the antenna 34a-34i and RF reader 28, they are only powered and operate when the antenna 34a-34i is connected to the reader 28. Furthermore there is also a delay in their operation as the power required to operate the tags builds up. Accordingly initially the tags will operate relatively slowly, but will speed up as the inductive power increases the longer the antenna 34a-34i is connected and inductive power supplied and during continued operation. By only intermittently connecting the antennas 34a-34i the build up in power, and time over which the RFID tags actually operate is reduced (i.e. the tags are not excited and do not operate all the time) so that their operating speed and power build up is reduced. The tags are therefore provided with a recovery time, while the antenna 34a-34i is disconnected and during the intermittent operation enabling them to continue to work at the low temperatures.

In this embodiment the switches 38 for each of the antenna 34a-34i are operated sequentially to separately connected each antenna 34a-34i for a period of 30 seconds before disconnecting the antenna 34a-34i and switching on the next. Accordingly with for example, nine antennas each antenna 34a-34i is switched on for 30 seconds every 270 seconds.

It should be noted that such intermittent connection to the antenna 34a-34i is unconventional. In a typical RFID tracking systems the antenna is always connected to the RF reader 28 to continually power and communicate with any RFID tags in the antenna reception region. In addition conventionally it is desirable to operate the ASIC of the RFID tags as fast as possible to ensure rapid communication such that slowing the operation is generally not considered desirable.

A FET switch 38 is preferably used since this operates well at the low freezer temperatures, and furthermore advantageously has an 'on' resistance which decreases at lower temperature. In addition the operating speed (opening and closing speed) which typically open and close within 0.1 s, and further operating characteristics of such FET switches has been found to be particularly suitable for the switching and operation with the RFID tags to slow the operation of the RFID tags. Such FET switches can also be readily electronically controlled to provide the required switching and selective and intermittent connections. It will though be appreciated that other electronic switches could be used.

Advantageously by locating the FET switch 38 between the antenna 34a-34i and the RF reader 28, the RF reader 28 can continually operate while allowing the FET switch 38 to then simply and reliably control and regulate the actual interaction and communication with the RFID tags via the antenna 34a-34i.

The FET switch 38 is also preferably mounted with the antenna 34a-34i itself. This is a further significant aspect of the invention. In particular it is advantageous to incorporate and integrate the switches 38 with the respective antenna 34a-34i, so that they are close to the actual antenna 34a-34i unit. This ensures that the antenna are isolated and even when disconnected do not resonate and form a resonant circuit that may undesirably resonate at the operating frequencies even when disconnected especially when, as explained further below multiple antennas 34a-34i are used. Furthermore such integration of the switches 36 with the antenna 34a-34i simplifies the overall assembly.

A single antenna connected to the RF reader 28 could be used for monitoring and communicating with all of the RFID tags and vials in the freezer. However due to the number of tags this would lead to all of the RFID tags operating at the same time and interference between the various signals. Furthermore to operate effectively the antenna 34a-34i must be tunned for a particular inductively coupled load. The freezer 10 may though contain any number vials and RFID tags so varying the load and making it difficult to tune and match a single antenna to varying number of tags in the freezer. Therefore preferably multiple localised antennas 34a-34i are used which are disposed and located within the freezer 10 to operate over different localised regions and areas of the freezer 10. In particular, and in this embodiment a separate antenna 34a-34i comprising a single turn of copper wire surrounds each box 24 of vials location within the freezer 10. This reduces the variation in load for each antenna 34a-34i such that by tunning each antenna 34a-34i to match the median load for that box 24, for example of fifty vials/RFID tags in a box 24, the antenna 34a-34i while not fully matched is adequately matched and tuned so that it can work effectively across the range of loads and number of vials (zero to one hundred) which may be present in any one box and at any one antenna location.

The antenna 34a-34i is tuned to the median load by selecting the antenna area and matching and adjusting the series driver capacitance 40 and parallel resonance capacitance 42 within the interface unit 36. This adjustment tuning is also, due to the effect the outer casing 16 of the freezer 10, preferably carried in situ when the antenna 34a-34i is installed within the freezer 10 and with a median load.

Each of the antennas 34a-34i is separately connected via the FET switch 38 to the interface and RF reader 28. FET switches 38 are associated with each antenna 34a-34i, in addition to being intermittently operated to reduce the power and speed as described above to allow low temperature operation, may also be selectively operated to only connect one antenna 34a-34i at a time to the RF reader 28. In particular each FET switch 38 is selected and operated (intermittently to regulate power and speed if operating in the low temperature environment) to connect each a particular antenna 34a-34i to the RF reader 28 in turn. As a result only one antenna 34a-34i transmits a signal to inductively induce the RFID tags in the region of the that antenna 34a-34i at a time. Accordingly only RFID tags in that region are specifically and principally activated and operate.

In addition, and in particular by incorporating the FET switches 38 close to and with the antenna 34a-34i to disconnect the antenna from and RF reader 28 and also the rest of the circuit, any sympathetic resonance that can occur between the operative and other antennas is reduced, since the disconnected antenna are isolated and do not in themselves resonate and form a resonant circuit that may undesirably resonate at the operating frequencies even when disconnected. In other arrangements where the switch is remote from the antenna 34a-34i and connected to the antenna via for example a long lead the lead and antenna, even when disconnected from the RF reader 34, may form a resonant circuit and resonate at the operating frequencies in sympathy when neighbouring antennas are excited, leading to possible undesirable interference.

Furthermore, and since the other antenna 34a-34i are not connected to the RF reader 28, only response signals from tags in the region of the particular antenna 34a-34i being operated are received by the RF reader 28.

Accordingly only RFID tags in the particular region of the individual antenna 34a-34i are operated and read at a time which reduces the interference from the multiple RFID tags. In addition by using localised antenna 34a-34i the positions of each response and so RFID tag within the freezer 10 can be determined since only tags within a particular antenna region will respond when each antenna is operated.

This further selective use of an electronic switch 38 to selectively connect localised antenna 34a-34i selectively to the RF reader 28 may also be used separately to operating the FET switch 38 intermittently to allow low temperature operation. In particular the selective operation of localised antenna 34a-34i using an electrical switch 38 could be used in systems operating a normal temperatures.

It will also be appreciated that separate electronic, and preferably FET switches could be provided, with a first FET switch connected to the RF reader 28 to intermittently control the antenna to reduce the power and speed and allow low temperature operation, and then further FET switches connected between the first switch and the respective antenna to select which antenna is connected to the RF reader. It is however preferable to use only one switch for each antenna to both select which antenna is to be operated at any one time and intermittently operate that antenna.

Figure 2:
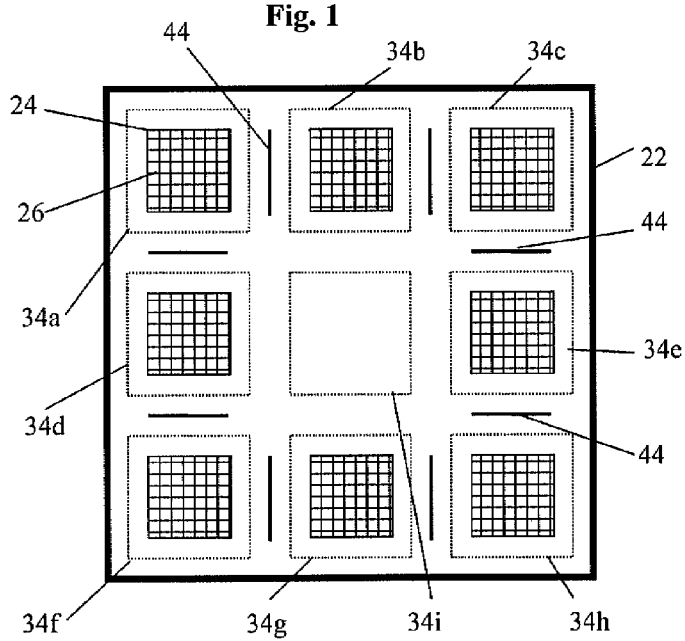
FIG. 2 is a schematic plan view of a shelf of the freezer of FIG. 1 and showing the possible location of various boxes of vials within the freezer.
Figure 3:
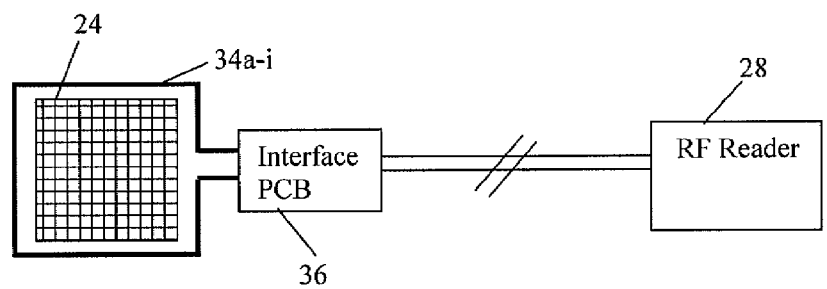
FIG. 3 is a schematic illustration one of the RF reader, interface, and an antenna monitoring one of the boxes of vials stored in the freezer.

To prevent further interference and interaction between the vials in the different antenna regions on the shelves 22, the shelves may also incorporate metal, preferably copper, plates or vanes 44 disposed between the different antenna regions, as shown in FIG. 2. These plates may preferably be incorporated into the sides walls of any detents or recess defined in the shelf 22 assembly for receiving the boxes 24. Alternatively the plates 44 may extend, from the base of the shelves 22. The plates 44 act a shields further reducing the transmission of signals between the antenna regions, and interaction between the antenna 34a-34i of one region and RFID tags in another antenna region. The plates 44 typically project 25 mm from the antenna coil (above and/or below the plane of the antenna coil), and do not end to entirely surround the actual vials, but may only locally shield the RFID tags and/or antenna coil from adjacent RFID tags and antenna coils.

The multiple antennas 34a-34i, furthermore preferably the FET switches and interface 36, are preferably integrated into each of the plastic shelves 22 of the freezer 10 in the region where each of the boxes 24 of vials may be placed, as shown in FIG. 2. Such shelves 22 then comprise integrated antenna shelves or smart shelves for connection to the RF reader 28. Each smart shelf is then connected and may be 'plugged in' via a suitable preferably single connector which connects to all the antenna 34a-34i and switches 38 of the shelf 22 to the RF reader 38 located outside of the freezer 10. This is simple and convenient and reduces the number of separate items and connection that have to be connected by a user with the 'smart shelve' simply replacing the existing freezer shelves and including all the additional hardware and ready for simple plug connection to the RF reader 28.

In order to reduce further interference between the vials the central position and antenna 34i in the shelf 22, which is surrounded by further boxes of vials and RFID tags is preferably left as a void and not used, as shown in FIG. 2. This is because this position being surrounded by the other boxes 24 and antenna 34a-34h and so is most affected by interference and interaction from the adjacent location and antenna.

In operation, the tag number from each vial to be stored in the freezer 10 is entered and stored in the computer system 32 and database. The contents information and other details of relating to the vial and its contents are then also stored against the identification number in the computer systems and database. The database and computer systems 32 thereby contains a full inventory listing of the contents of each vial within the freezer 10. The system 32 and RF reader 28 then selectively operates each antenna 34a-34i in turn by operating the respective FET switches 38 causing the RFID tags in each antenna location to transmit their identification signal which are received by the respective antenna 34a-34i and RF reader 34, and computer system 32. The computer system 32 can thereby identify and monitor the vials stored at a particular antenna location and record that location against those vials in the database. Furthermore the computer system 32 can also verify and continually then monitor that the vials which have been stored in the freezer 10 still and should be in the freezer 10 are still in the freezer 10 without having to open the freezer door 18, and automatically. The computer system 32 can then identify if any vials are removed from the freezer 10, and if such removal has not been authorised and notified within the computer system 32 an alert may be activated. Alternatively or additionally the computer system 32 may control an electronic lock 20 on the freezer 10 and prevent access unless and until such authorisation has first been given to remove a particular vial identified as being in the freezer by its unique identification. The computer system 32 can also provide the location within the freezer 10, and relating to the respective associated antenna location, of the particular vial to be removed. The computer system 32 may also incorporate other conventional inventory tracking, monitoring and audit features.

Using the above arrangement in a particular embodiment a freezer operating at −86° C. with four shelves 2, with each shelf containing eight box locations and each box 24 potentially containing one hundred vials can contain up to 3200 vials which can be each individually identified from their unique identification number on their RFID tags using the RF reader 28.

While typical freezer units 10 for storing biological samples operate at −80° C., and this system enables suitable operation at such low temperature, the systems can also operate at other temperatures. In particular the system may operate successfully down to −156° C. and with liquid nitrogen cooled storage vessels which can cool down to these temperatures. Certain modifications may though be required, in particular to the materials to operate at such very low temperatures where, in particular an number of plastics which may be used become very brittle, and special low temperature FET switches 38 may then be needed.

It will be appreciated that various modifications to the preferred embodiments described may be made. For example the number of shelves 22 may be varied, and the number of boxes 24 on each shelf 22 and number of individual vials in each box 24 may be different. In addition while it is preferable to use separate boxes 24 to contain a number of vials the boxes 24 could be omitted and the vials could each be stored directly on each shelf 22 without such boxes 24.

Furthermore while the invention is particularly directed to storing vials containing biological specimens it could be used to monitor other articles stored at low temperatures and to which suitable REID tags are attached and/or integrated.

In addition while the invention is particularly applicable and directed to monitoring articles and operating RFID tags at low temperatures, it will be appreciated that aspects of the invention can be used and may be applicable to operation at more normal temperatures and environments. In particular the selective and localised operation of the antennas to reduce interference and improve tunning may be more generally applicable.

Other modifications and applications of the invention will also be recognized by those skilled in the art.

The principle and mode of operation of this invention have been explained and illustrated in its preferred embodiment. However, it must be understood that this invention may be practised otherwise than as specifically explained and illustrated without departing from its spirit or scope.

The invention claimed is:

1. A radio frequency identification (RFID): monitoring system for monitoring a plurality of RFID tags in ultra-low temperatures, the system comprising: an RFID reader; a plurality of antennas each for transmitting and receiving RF signals to communicate with the RFID tags; and
   a plurality of electronic switches each interposed between the RFID reader and each of the plurality of antennas, wherein each respective electronic switch is selectively operable to connect a respective antenna to the RFID reader and transmit RF signals from the respective antenna to the RFID tags, and
   wherein each respective switch is controlled to intermittently connect the antenna to the RF reader to regulate the power of the RF signal transmitted from the respective antenna,
   wherein intermittently connecting the antenna further regulates the operation of the RFID tags, thereby further regulating power build up within an Application Specific Integrated Circuit of the RFID tags therein, thereby limiting the speed of induced operation of the RFID tags to enable the system to operate at ultra-low temperatures, below −40° C.

2. The REID monitoring system of claim 1 wherein the switch is controlled to intermittently connect the antenna to the RF reader by a control signal from the RF reader.

3. The RFID monitoring system of claim 1 wherein the electronic switches are operable to connect only one antenna to the RF reader at a time.

4. The RFD monitoring system of claim 1 wherein the electronic switch is configured to selectively disconnect the antenna.

5. The RFD monitoring system of claim 1 wherein the electronic switch comprises a field effect transistor.

6. The UM monitoring system of claim 1 wherein each respective electronic switch is integrated with a respective antenna of an antenna assembly comprised of the plurality of antennas.

7. The RFID monitoring system of claim 1 wherein the system is capable of operating at a temperature of between −40 C and −156 C.

8. The RFID monitoring system of claim 1 wherein the system is capable of operating at a temperature of −80° C.

9. The RFID monitoring system of claim 1 for monitoring a plurality of storage vials each incorporating an integrated RFID tag.

10. A storage unit for storing a plurality of articles each contacting a radio frequency identification (RFID) tag, said storage unit comprising: an RFID reader; a plurality of electronic switches each interposed between the RFID reader and each of the plurality of antennas, wherein each respective electronic switch is selectively operable to connect a respective antenna to the RFID reader and transmit RF signals from the respective antenna to the RFID tags, and wherein each respective switch is controlled to intermittently connect the antenna to the RF reader to regulate the power of the RF signal transmitted from the respective antenna, wherein intermittently connecting the antenna further regulates the operation of the RFID tags, thereby further regulating power build up within an Application Specific Integrated Circuit of the RFID tags therein, thereby limiting the speed of induced operation of the RFID tags to enable the system to operate at ultra-low temperatures, below −40° C.

11. The storage unit of claim 10 wherein each one of the plurality of antennas are located within the storage unit to operate over a discrete localized region of the storage unit.

12. The storage unit of claim 11 further comprising at least one metallic plate disposed adjacent to one of the plurality of antennas to shield the one of the plurality of antennas from a remaining region of the storage unit.

13. The storage unit of claim 10 comprising at least one shelf.

14. The storage unit of claim 13 wherein the plurality of antennas are mounted to the shelf.

15. The storage unit of claim 13 wherein the plurality of antennas are integrated into the shelf.

16. The storage unit of claim 15 wherein the plurality of antenna are integrated into the shelf to define respective localized operative regions of the shelf.

17. The storage unit of claim 15 wherein the electronic switch is integrated with the shelf and antenna.

18. The storage unit of claim 9 wherein the storage unit comprises a freezer unit.

19. A shelf for use in a storage unit, said shelf comprising: a shelf body upon which articles with RFID tags may be located and said shelf body integrating therewith: an RFID reader; a plurality of antennas each for transmitting and receiving RF signals to communicate with the RFID tags in ultra-low temperatures: a plurality of electronic switches each interposed between the RFID reader and each of the plurality of antennas, wherein each respective electronic switch is selectively operable to connect a respective antenna to the RFID reader and transmit RF signals from the respective antenna to the RFID tags, and wherein each respective switch is controlled to intermittently connect the respective antenna to the RF reader to regulate the power of the RF signal transmitted from the antenna, wherein intermittently connecting the antenna further regulates the operation of the RFID tags, thereby further regulating power build up within an Application Specific Integrated Circuit of the RFID tags therein, thereby limiting the speed of induced operation of the RFID tags to enable the system to operate at ultra-low temperatures, below −40° C.

20. The shelf of claim 19 further comprising at least one metallic plate disposed adjacent to one of the plurality of antennas to shield the one of the plurality of antennas from a remaining region of the shelf.

21. The shelf of claim 19 wherein the plurality of antennas are integrated into respective discrete operative regions of the shelf.

22. A method of monitoring a plurality of RFID tags using an RFID reader and a plurality of antennas connected to the RFID reader by a respective plurality of electronic switches, the method comprising operating the RFID reader to generate an RF signal for communicating with the RFID tags in ultra-low temperatures, and selectively operating a respective switch to connect a respective antenna to the RFID reader and transmit RF signals from the antenna to the RFID tags, wherein each switch is operated to intermittently connect the respective antenna to the RF reader to regulate the power of the RF signal transmitted from the respective antenna, wherein intermittently connecting the antenna further regulates the operation of the RFID tags, thereby further regulating power build up within an Application Specific Integrated Circuit of the RFID tags therein, thereby limiting the speed of induced operation of the RFID tags to enable the system to operate at ultra-low temperatures, below −40° C.

* * * * *